US008849472B2

(12) United States Patent
Pugh et al.

(10) Patent No.: US 8,849,472 B2
(45) Date of Patent: Sep. 30, 2014

(54) EFFECTUATING ENERGIZATION AND DEACTIVATION OF PARTICULAR CIRCUITS THROUGH RULES-BASED SMART NODES

(75) Inventors: William Clayton Pugh, Haymarket, VA (US); Richard Daniel Albarran, Bethesda, MD (US); Jason Bruce Craig, Fairfax, VA (US)

(73) Assignee: InScope Energy, LLC, Reston, VA (US)

( * ) Notice: Subject to any disclaimer, the term of this patent is extended or adjusted under 35 U.S.C. 154(b) by 372 days.

(21) Appl. No.: 13/019,952

(22) Filed: Feb. 2, 2011

(65) Prior Publication Data

US 2012/0197453 A1    Aug. 2, 2012

(51) Int. Cl.
G06F 19/00    (2011.01)
G01D 4/00    (2006.01)
H02J 3/14    (2006.01)

(52) U.S. Cl.
CPC ............... *G01D 4/002* (2013.01); *Y02B 90/244* (2013.01); *H02J 3/14* (2013.01); *Y04S 20/327* (2013.01); *Y02B 90/241* (2013.01); *Y04S 20/32* (2013.01)
USPC .............. 700/295; 700/292; 700/294; 307/29

(58) Field of Classification Search
CPC ........... G06F 1/28; G06F 1/32; G06F 1/3203; G06F 1/3287; G05B 15/02; H02J 3/14
USPC .................. 700/22, 292–295; 307/29; 429/17
See application file for complete search history.

(56) References Cited

U.S. PATENT DOCUMENTS

| | | | |
|---|---|---|---|
| 4,660,332 A | 4/1987 | Colvin, Jr. ..................... 52/79.5 |
| 5,020,411 A | 6/1991 | Rowan ............................ 89/1.11 |
| 6,157,527 A | 12/2000 | Spencer et al. ................. 361/64 |
| 6,252,311 B1 | 6/2001 | West ................................ 307/29 |
| 6,614,204 B2 | 9/2003 | Pellegrino et al. ............. 320/109 |
| 6,816,466 B1 | 11/2004 | Daniel .......................... 370/254 |
| 6,904,385 B1 * | 6/2005 | Budike, Jr. ..................... 702/182 |
| 7,188,003 B2 * | 3/2007 | Ransom et al. ................ 700/286 |
| 7,353,653 B2 | 4/2008 | Bronicki .......................... 60/646 |
| 7,379,791 B2 | 5/2008 | Tamarkin et al. ............. 700/286 |
| 7,402,978 B2 | 7/2008 | Pryor ............................. 320/104 |
| 7,428,816 B2 | 9/2008 | Singh et al. ..................... 60/651 |
| 7,719,257 B2 | 5/2010 | Robarge et al. ........... 324/117 R |
| 7,788,516 B2 * | 8/2010 | Conroy et al. ................. 713/340 |
| 8,362,640 B2 | 1/2013 | Craig et al. ..................... 307/29 |
| 8,374,729 B2 * | 2/2013 | Chapel et al. ................. 700/295 |
| 8,427,002 B2 | 4/2013 | Craig ............................. 307/9.1 |
| 8,437,882 B2 | 5/2013 | Craig et al. ................... 700/295 |
| 8,648,490 B2 | 2/2014 | Craig ............................. 307/9.1 |
| 8,648,492 B2 | 2/2014 | Craig et al. ..................... 307/29 |
| 2003/0153216 A1 | 8/2003 | Van-Drentham-Susman . 440/45 |

(Continued)

FOREIGN PATENT DOCUMENTS

WO    WO 2008/113052    9/2008
WO    WO 2011/103262    8/2011

*Primary Examiner* — Michael D Masinick
(74) *Attorney, Agent, or Firm* — Pillsbury Winthrop Shaw Pittman LLP (57) ABSTRACT

Systems for reducing power usage and/or wastage use sensors to gather information about a circuit and its usage. Triggers are identified based on the information from the sensors, and subsequently used to control power delivery by reversibly effectuating energization and deactivation of particular circuits through smart nodes.

28 Claims, 5 Drawing Sheets

(56) References Cited

U.S. PATENT DOCUMENTS

| | | | |
|---|---|---|---|
| 2004/0001292 A1 | 1/2004 | Vanderkolk | 361/42 |
| 2004/0095237 A1* | 5/2004 | Chen et al. | 340/506 |
| 2004/0174071 A1 | 9/2004 | Nierlich et al. | 307/11 |
| 2005/0008904 A1 | 1/2005 | Suppes | 429/9 |
| 2005/0084721 A1 | 4/2005 | Ikuma et al. | 429/22 |
| 2005/0252214 A1 | 11/2005 | Goldmeer et al. | 60/698 |
| 2006/0049694 A1 | 3/2006 | Kates | 307/132 E |
| 2006/0052905 A1 | 3/2006 | Pfingsten et al. | 700/286 |
| 2006/0228960 A1 | 10/2006 | Durling | 440/88 |
| 2006/0261213 A1 | 11/2006 | Lavan | 244/30 |
| 2007/0049133 A1* | 3/2007 | Conroy et al. | 439/894 |
| 2007/0049134 A1* | 3/2007 | Conroy et al. | 439/894 |
| 2007/0050650 A1* | 3/2007 | Conroy et al. | 713/300 |
| 2007/0128473 A1 | 6/2007 | Durling et al. | 429/13 |
| 2007/0128478 A1 | 6/2007 | Ballantine et al. | 429/17 |
| 2007/0137686 A1 | 6/2007 | Durling et al. | 136/205 |
| 2008/0019067 A1 | 1/2008 | Reynolds et al. | 361/93.1 |
| 2008/0224892 A1 | 9/2008 | Bogolea et al. | 340/870.3 |
| 2008/0255782 A1 | 10/2008 | Bilac et al. | 702/62 |
| 2009/0106571 A1 | 4/2009 | Low et al. | 713/310 |
| 2009/0144568 A1 | 6/2009 | Fung | 713/300 |
| 2009/0187284 A1* | 7/2009 | Kreiss et al. | 700/291 |
| 2009/0234512 A1 | 9/2009 | Ewing et al. | 700/295 |
| 2010/0030392 A1 | 2/2010 | Ferentz et al. | 700/295 |
| 2010/0102625 A1 | 4/2010 | Karimi et al. | 307/9.1 |
| 2010/0114392 A1 | 5/2010 | Lancaster | 700/292 |
| 2010/0145542 A1* | 6/2010 | Chapel et al. | 700/295 |
| 2010/0225167 A1 | 9/2010 | Stair et al. | 307/29 |
| 2010/0270933 A1* | 10/2010 | Chemel et al. | 315/130 |
| 2011/0012427 A1 | 1/2011 | Craig et al. | 307/29 |
| 2011/0039237 A1 | 2/2011 | Skare | 434/118 |
| 2011/0046805 A1* | 2/2011 | Bedros et al. | 700/291 |
| 2011/0172938 A1 | 7/2011 | Gu et al. | 702/62 |
| 2011/0174210 A1 | 7/2011 | Craig | 114/326 |
| 2011/0278921 A1* | 11/2011 | Fretheim et al. | 307/24 |
| 2012/0197453 A1 | 8/2012 | Pugh et al. | 700/293 |
| 2012/0209411 A1 | 8/2012 | Ohkado et al. | 700/80 |
| 2012/0223840 A1* | 9/2012 | Guymon et al. | 340/870.02 |
| 2013/0140885 A1 | 6/2013 | Craig et al. | 307/9.1 |
| 2013/0229051 A1 | 9/2013 | Craig | 307/9.1 |
| 2014/0152090 A1 | 6/2014 | Craig et al. | 307/9.1 |
| 2014/0210255 | 7/2014 | Craig | 307/9.1 |

* cited by examiner

EFFECTUATING ENERGIZATION AND DEACTIVATION OF PARTICULAR CIRCUITS THROUGH RULES-BASED SMART NODES

FIELD OF THE INVENTION

The invention relates to electrical power management. In particular, the invention relates to controlling and monitoring power delivery to circuits via a smart node.

BACKGROUND OF THE INVENTION

Typically local power networks (e.g., electrical infrastructure of a building and/or campus) include power lines, circuits, a distribution board, outlets, loads, as well as circuit breaker panels and/or breaker boxes, which lack dynamic functionality. As such, electrical power management may be performed either manually, or with timers located at individual power outlets within the local power network. Power wastage, such as with standby power usage, may account for a significant percentage of power consumption.

SUMMARY

One aspect of the invention relates to a system and method of dynamically monitoring and managing power distribution at a point of delivery of power to one or more circuits. For example, power distribution may be monitored and/or managed at a circuit breaker panel of a building or set of buildings, or at other locations. In some implementations, the system and/or method may be implemented in a circuit breaker panel of a residential, commercial, and/or military building in a retrofitted manner. The granular monitoring and/or dynamic management of power distribution described herein may enhance power efficiency, preserve power supply life (e.g., battery life), and/or provide other enhancements over conventional circuit breaker panel configurations.

A system configured to control power delivery from a power supply to an alternate current circuit may include a sensor, a smart node, a user interface and one or more processors. The alternate current circuit may include a circuit breaker and a load. The processors may be configured to execute one or more of a trigger module, a control module, an interface module, an analysis module, and/or other modules. The power supply may include one or more of a power plant, a power generator, a power storage device, utility grid, and/or other components. A power supply may be included within the power management system, and/or power may be delivered from a power supply that is external to the power management system.

The sensor may generate sensor output conveying information related to power delivered from the power supply to the alternate current circuit. The sensor may include one or more sensor units located at or near a circuit breaker in an alternate current circuit (e.g., within a circuit breaker panel), or near a load, and/or at other locations. A generated sensor output signal may correspond to a sensor output value, either of which may be used to determine and/or measure one or more quantifiers of power delivered to the circuit(s) associated with the sensor. The sensor may include one or more of a voltage sensing circuit, a current sensing circuit, a frequency sensing circuit, a power monitoring circuit, a power quality monitoring circuit (i.e. power factor), an energy usage circuit (i.e. KW/hr), or other circuitry.

The smart node may use a control signal to control the amount of power provided to an alternate current circuit—or a particular load in that circuit—from the power supply. Controlling the amount of power may include selectively and reversibly energizing and deactivating a node or relay by selectively and reversibly coupling and decoupling a load and/or circuit from the power supply. Controlling the amount of power may include selectively raising, lowering, or switching off the potential, current, total power, and/or other power parameters of the power provided to a load from the power supply through the node or relay. The smart node may be designed to be retrofitted into a conventional circuit breaker panel using manual circuit breakers for managing power surges, and/or other phenomena. Alternatively, and/or simultaneously, the smart node may be installed between a circuit and one or more loads that are electrically connected to the alternate current circuit outside of a circuit breaker panel. Retrofitting conventional circuit breaker panel with a smart node (and a circuit breaker) may provide some or all of the enhancements of monitoring and power management described herein (and/or other enhancements) within a previously manual, relatively static power management system.

The processor's executable computer program modules may include a trigger module, a control module, an interface module, an analysis module, and/or other modules. The trigger module may be configured to identify trigger events, including schedule-based events, rule-based events, user command events, and/or other events. Schedule-based events may include events that occur based on a temporal schedule. Schedule-based events may include periodic events and non-periodic events. For example, a periodic schedule-based event may reduce power usage and/or power wastage in a store after store hours, and/or on days that the store is closed. Rule-based events may include events that are triggered based on preconfigured rules that determine whether an event should be triggered as a function of one or more input parameters. As an example, a rule-based event may be triggered responsive to detection that a residential alarm system has been activated, which may indicate there are currently no residents in the residence. User command events may include manual user overrides input by one or more users. As such, user command events may reverse the current, or future, state of a particular node or relay in the absence of a manual override.

The control module may be configured to generate the control signal that controls the amount of power provided from the power supply to a load and/or circuit. The control signal may be based on trigger events identified by the trigger module, any factors that affect the trigger events, commands received from a user (e.g. via a user interface), information related to sensor output, scheduled programming, and/or other bases. Additional factors that may be considered during the operation of the control module are safe operating limits and programmable delays for various trigger events. For example, some critical circuits may never be completely powered down for safety reasons, regardless of instructions to the contrary from a user or the trigger module.

The interface module may be configured to exchange information with a user. For example, it may convey power information to a user, related to power delivered from the power supply to a circuit and/or a load. Alternatively, and/or simultaneously, the interface module may receive user commands from a user that affect operation of one or more computer program module, circuits, and/or other components of the power management system. Conveying information may include processing sensor output, measuring delivered power, and controlling a user interface to present and/or display any information to a user. Alternatively, the interface module may communicate any information to a remote control and/or monitoring device, e.g. by using an open or proprietary wireless communication protocol, including those currently used for commercially available power switching devices.

The analysis module may be configured to determine the basis for new trigger events and/or alter—i.e. fine-tune—the basis for existing trigger events. The power usage of the various alternate current circuits in a power management system may exhibit certain patterns. By recognizing those patterns, power usage and/or power wastage may be reduced. The analysis module may use a prediction model to aid pattern analysis.

Some embodiments of the present technology may be packaged in an enclosure configured to be mounted in a circuit breaker panel, e.g. in a retrofitted manner. Alternatively, only part of a particular embodiment may be packaged in an enclosure configured to be mounted in a circuit breaker panel. Communication with and/or within a power management system may use system and/or component identifiers, e.g. to distinguish easily between sensor output from different sensors.

These and other components, objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
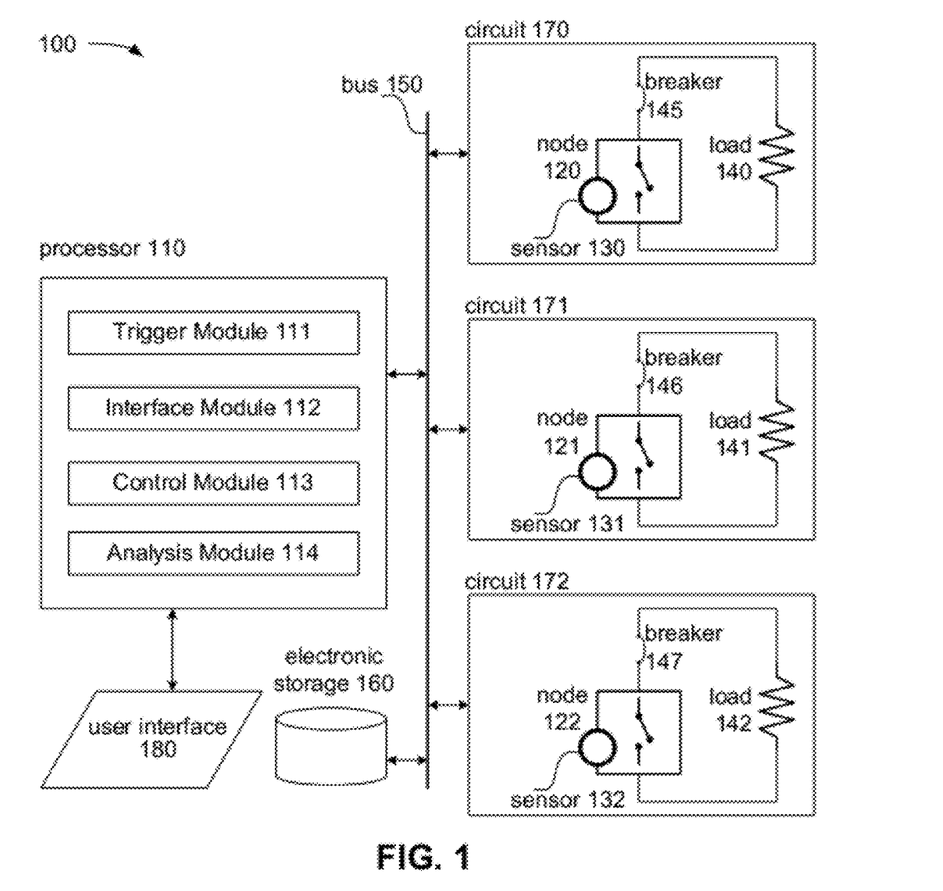
FIG. 1 illustrates an exemplary implementation of a power management system.

FIG. 1 illustrates an exemplary implementation of a power management system 100. Power management system 100 may be configured to control power delivery from a power supply to a circuit, and may include one or more of electronic storage 160, bus 150, processor 110, user interface 180, one or more circuits such as circuit 170, circuit 171, and circuit 172, and/or other components.

Power management system 100 may receive electrical power from at least one power supply. The power supply, or power supplies, may comprise any source or sources of electrical power, including the utility grid. For example, the power supply may include a remote power generation installation such as a power plant. Such a power plant may include coal-burning power plant, a nuclear power plant, and so on. As another example, the power supply may include a power generator that converts tidal energy of the ocean into power that is usable within power management system 100. Additionally or alternatively, the power supply may include a local power generation installation such as one or more solar cells that convert electromagnetic radiation from the sun to power that is usable within power management system 100. The power supply may include a portable generator that operates, for example, on gasoline. The power supply may include power storage devices such as batteries and/or capacitive storage devices. According to some implementations, the power supply may be contained within power management system 100. Electrical power may be delivered from the power supply to the circuits and/or loads via power lines or radio frequency.

In one embodiment, electronic storage 160 comprises electronic storage media that electronically stores information. The electronically storage media of electronic storage 160 may include one or both of system storage that is provided integrally (i.e., substantially non-removable) with power management system 100 and/or removable storage that is removably connectable to power management system 100 via, for example, a port (e.g., a USB port, a FireWire port, etc.) or a drive (e.g., a disk drive, etc.). Electronic storage 160 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 160 may store software algorithms, information determined by processor 110, information received via user interface 180, and/or other information that enables power management system 100 to function properly. Electronic storage 160 may be a separate component within power management system 100, or electronic storage 160 may be provided integrally with one or more other components of power management system 100 (e.g., processor 110).

Processor 110 is configured to provide information processing capabilities in power management system 100. As such, processor 110 may include one or more of a digital processor, an analog processor, a digital circuit designed to process information, an analog circuit designed to process information, a state machine, and/or other mechanisms for electronically processing information. Although processor 110 is shown in FIG. 1 as a single entity, this is for illustrative purposes only. In some implementations, processor 110 may include a plurality of processing units. These processing units may be physically located within the same device, or processor 110 may represent processing functionality of a plurality of devices operating in coordination. For example, in one embodiment, the functionality attributed below to processor 110 is divided between a first processor that is operatively connected to a monitor in a device designed to be portable, or even wearable, by a user, and a second processor that communicates with the portable device at least periodically to obtain information generated by a monitor and further process the obtained information. In this embodiment, the second processor of processor 110 may include a processor provided by a host computer. Processors external to other components within power management system 100 (e.g., the second processor mentioned above) may, in some cases, provide redundant processing to the processors that are integrated with components in power management system 100 (e.g., the first processor mentioned above), and/or the external processor(s) may provide additional processing to determine additional information related to the operation of power management system 100.

As is shown in FIG. 1, processor 110 may be configured to execute one or more computer program modules. The one or more computer program modules may include one or more of a trigger module 111, an interface module 112, a control module 113, an analysis module 114, and/or other modules. Processor 110 may be configured to execute modules 111, 112, 113, and/or 114 by software; hardware; firmware; some combination of software, hardware, and/or firmware; and/or other mechanisms for configuring processing capabilities on processor 110.

It should be appreciated that although modules 111, 112, 113, and 114 are illustrated in FIG. 1 as being co-located within a single processing unit, in implementations in which processor 110 includes multiple processing units, one or more of modules 111, 112, 113, and/or 114 may be located remotely from the other modules. The description of the functionality provided by the different modules 111, 112, 113, and/or 114 described below is for illustrative purposes, and is not intended to be limiting, as any of modules 111, 112, 113, and/or 114 may provide more or less functionality than is described. For example, one or more of modules 111, 112, 113, and/or 114 may be eliminated, and some or all of its functionality may be provided by other ones of modules 111, 112, 113, and/or 114. As another example, processor 110 may be configured to execute one or more additional modules that may perform some or all of the functionality attributed below to one of modules 111, 112, 113, and/or 114.

User interface 180 is configured to provide an interface between power management system 100 and a user through which the user may provide information to and receive information from power management system 100. This enables sensor output values, results, system status information, user commands, instructions, and/or any other communicable items, collectively referred to as "information," to be communicated between the user and one or more of a monitor, processor 110, and electronic storage 160. Examples of interface devices suitable for inclusion in user interface 180 include a keypad, buttons, switches, a keyboard, knobs, levers, a display screen, a touch screen, speakers, a microphone, an indicator light, an audible alarm, and a printer. In one embodiment, user interface 180 may include a plurality of separate interfaces, including one interface that is provided in a device integral with a monitor, and a separate interface provided to view and/or manage stored information that has been retrieved from the device integrated with said monitor (e.g., provided by a host computer to which information from the monitor and other accompanying components of power management system 100 can be received).

It is to be understood that other communication techniques, either hard-wired or wireless, are also contemplated by the present invention as user interface 180. For example, the present invention contemplates that user interface 180 may be integrated with a removable storage interface provided by electronic storage 160. In this example, information may be loaded into power management system 100 from removable storage (e.g., a smart card, a flash drive, a removable disk, etc.) that enables the user(s) to customize the implementation of power management system 100. Other exemplary input devices and techniques adapted for use with power management system 100 as user interface 180 include, but are not limited to, an RS-232 port, RF link, an IR link, modem (telephone, cable, Ethernet, internet, or other). In short, any technique for communicating information with power management system 100 is contemplated by the present invention as user interface 180.

Bus 150 may be configured to transport control signals to a circuit such as circuit 170, sensor output values from a sensor such as sensor 130 to another component of power management system 100, sensor output values and/or other information to be stored in electronic storage 160, and other control signals and information pertaining to the operation of power management system 100. Control signals and sensor output values may use separate buses, share the same bus, or use point-to-point connections. The depiction of bus 150 in FIG. 1 as a single element will be understood not to be limiting the scope of this disclosure. The connections between components illustrated in FIG. 1 as being embodied in bus 150 may include wired and/or wireless connections.

Circuit 170 may include a smart node 120, a circuit breaker 145, sensor 130, load 140, and/or other components. Some or all of the components of circuit 170 may be electrically connected to form a circuit, e.g. an AC circuit, a DC circuit, and/or other circuits. Sensor 130 may be associated with smart node 120 and/or circuit 170. Sensor 130 may be configured to generate a sensor output signal conveying information related to power delivered from the power supply to the associated circuit 170. Circuit 171 and circuit 172, depicted in FIG. 1, may include similar or substantially the same components as circuit 170. As such, circuit 171 may include smart node 121, circuit breaker 146, sensor 131 which may be associated with smart node 121 and/or circuit 171, load 141, and/or other components. Similarly, circuit 172 may include smart node 122, circuit breaker 147, sensor 132 which may be associated with smart node 122 and/or circuit 172, load 142, and/or other components.

Smart node 120 may be configured to be controlled by a control signal originating from control module 113, or any other computer program module of processor 110. For example, smart node 120 may be controlled by user commands received via user interface 180. Smart node 120 may be controlled to control the amount of power provided to load 140 from the power supply. Controlling the amount of power may include selectively and reversibly energizing and deactivating smart node 120 by selectively and reversibly coupling and decoupling load 140 from the power supply. Controlling the amount of power may include selectively raising, lowering, or switching off the potential, current, total power, and/or other power parameters of the power provided to load 140 from the power supply through smart node 120. Smart node 120 may be designed to be retrofitted into a conventional circuit breaker panel with manual circuit breakers for monitoring or managing power surges, and/or other phenomena. Alternatively, and/or simultaneously, smart node 120 may be installed between a circuit and one or more loads that are electrically connected to the circuit outside of a circuit breaker panel. Retrofitting smart node 120 and circuit breaker 145 into a conventional circuit breaker panel may provide some or all of the enhancements of power management described herein (and/or other enhancements) within a previously manual, relatively static power management system.

Sensor 130 may be located at or near smart node 120, and may be configured to generate a sensor output signal—having a sensor output value—conveying information related to power delivered from the power supply to circuit 170. Sensors such as sensor 130, sensor 131, and sensor 132 may comprise a voltage sensing circuit, a current sensing circuit, a frequency sensing circuit, a power monitoring circuit, a power quality monitoring circuit, a power quality monitoring circuit, an energy usage circuit, or other circuitry configured to provide power information that may be used to determine and/or measure a level of power delivered to the circuit associated with the sensor. The depiction of sensor 130—or any other sensor in FIG. 1—as a single element will be understood not to be limiting the scope of this disclosure. For example, sensor 130 may comprise multiple circuits monitoring various electrical parameters related to circuit 170, including voltage, current, frequency, energy usage, delivered power, and/or other parameters a power meter commonly monitors, measures, and/or tracks.

Load 140 (and/or load 141 and/or load 142) may include any apparatus (or apparatuses) that requires electrical power to perform at least one functionality attributed thereto. Examples of the loads may include appliances such as HVAC systems and kitchen appliances, lighting fixtures, consumer electronic devices such as computers and stereos, and/or any other apparatus that can be configured to consume electrical power. Some of the loads may be permanently integrated with the local power network. In contrast, some of the loads may be removably coupled with the local power network. For example, power outlets (e.g., conventional wall outlets, and/or other power outlets) associated with circuit 170 may provide power interfaces at which loads may be removable coupled with circuit 170. The loads may be controlled in various manners including, but not limited to, turning on, turning off, and/or changing a power level (e.g., brightness for lights, temperature for HVAC systems, and so forth).

Power management system 100 may reduce usage and/or wastage of electrical power, which may occur at one or more levels of the power grid represented by circuits 170, 171, and 172. Local power networks, such as may be found in buildings, homes, and businesses, typically lack the dynamic functionality to manage power distribution effectively at a fine granularity. Power management system 100 may be configured to control power delivery from a power supply to circuit 170 and/or other circuits, e.g. at or near the circuit breaker level by using smart node 120. This granular control may reduce power leached by deactivated loads during inoperation, reduce power loss in lines between smart node 120 and load 140 when load 140 is not actively in operation, and/or reduce other power loss.

Electrical power is delivered from a power supply to a circuit such as circuit 170 via various network components, including, at some point, a circuit breaker. Replacing a traditional circuit breaker by smart node 120—and associated components and/or (management) systems described herein—provides many advantages.

One or more components of power management system 100 may be communicatively coupled with at least one smart node—e.g. smart node 120—or a constituent component thereof. Alternatively, one or more components of power management system 100 may be communicatively coupled with multiple smart nodes—e.g. smart node 120, smart node 121, and smart node 122—or respective constituent components thereof (e.g., via bus 150 as described above). In some implementations, one or more components of power management system 100 and one or more smart nodes may be integrated as a single device having some or all of the functionalities attributed herein with the components of a power management system and a smart node.

Sensor output values from smart node 120 may be stored in electronic storage 160, which is depicted in FIG. 1 to be coupled with bus 150. Simultaneously and/or alternatively, sensor output values from any circuit breaker may be communicatively coupled to electronic storage 160 by other means that may or may not require any bus in general or bus 150 in particular.

Regarding the executable computer program modules of processor 110 in FIG. 1, trigger module 111 may be configured to identify trigger events. Trigger events may be events that trigger one or more parameters of the operation of one or more of smart nodes 120, 121, and/or 122 to be adjusted, optionally through and/or via other computer program modules, e.g. control module 113. Trigger events may include schedule-based events, rule-based events, user command events, and/or other events.

Schedule-based events may take into account scheduling criteria, planning requirements, time and/or date. For example, certain businesses may adhere to a particular holiday schedule when offices are closed. Schedule-based events may take place periodically (e.g., daily, monthly, weekly, yearly), based on individually planned events or activities (e.g., a party, meeting, a game, and/or other events or activities), and/or based on other events that are scheduled.

Rule-based events may take into account events that are internal to power management system 100, such as particular levels of sensor output signals as compared to power usage thresholds, or activation of one or more of circuits such as circuit 170. Alternatively and/or simultaneously, rule-based events may be external to power management system 100, such as a power usage pattern of other systems that draw power from the power supply. For example, a residential power management system may respond to the detection of a garage door opening by energizing a specific set of other circuits (e.g., circuits with loads likely to be used by a user returning home). As another example, a security system in a building may be aware which floors appear to be currently empty, and provide such information to the power management system in order to prevent power wastage. This type of rule-based event may cause power management system 100 to de-activate circuits associated with floors that appear to be empty. Rule-based events may be based on programmed rules and/or on rules developed based on usage patterns. A usage pattern or scenario may be previously stored or programmed, and/or developed by analyzing power usage over time. A rule could take prior sensor output values into account, or prior usage averages, which may be stored in and retrieved from electronic memory 160 via bus 150. A rule could be based on external information and/or any other factors. For example, a rule could evaluate how many monitors in an office are powered down, and prevent power wastage based on that information. As another example, a usage pattern or scenario may develop over time for a residential local power network whenever multiple football games are broadcasted. Perhaps, in this example, multiple television-sets use power in one area of a residence, in addition to a hot tub elsewhere in the residence. In this scenario, power wastage related to other loads may be probable, and reducible. A usage pattern need not be explicitly programmed to be a trigger event.

User command events may include business rules, optimization parameters, manual overrides, and/or other factors. User commands may be received via user interface module 112. A user command may simply force a particular circuit to be activated or deactivated. Alternatively, a user command may specify that all circuits matching some criteria are to be activated or deactivated. Criteria may be based on power usage levels, location, and/or any other distinguishing features.

Different types of trigger events may also be combined. For example, schedule-based and rule-based triggers may be combined: on particular week-days, a low power usage level indicated by sensor 130, combined with a low power usage level indicated by sensor 132, may signify, according to some rule, that power wastage in all three circuits shown in FIG. 1 may be reduced by reversibly effectuating deactivation through smart node 120, smart node 121, and smart node 122. Various basic trigger events, from the same and/or different event trigger types, may be combined to create more complex trigger events.

Interface module 112 may be configured to convey power information to a user, related to power delivered from the power supply to circuit 170 and/or any other circuits. The power information may be based on sensor output values from sensor 130. Conveying power information may include processing sensor output signals and/or values, measuring delivered power, and controlling user interface 180 to present and/or display any information to a user. Alternatively, interface module 112 may communicate any information to a remote control and/or monitoring device, e.g. by using an open or proprietary wireless communication protocol, including those currently used for commercially available power switching devices.

Alternatively, and/or simultaneously, interface module 112 may be configured to receive user commands that affect operation of one or more computer program modules, circuits, and/or other components of power management system 100.

Control module 113 may be configured to control the amount of power provided from the power supply to load 140 and/or other loads. For example, with regard to circuit 170, controlling the amount of power may include selectively and reversibly energizing and deactivating smart node 120 by selectively and reversibly coupling and decoupling load 140 from the power supply. Controlling the amount of power may include selectively raising, lowering, or switching off the potential, current, total power, and/or other power parameters of the power provided to load 140 from the power supply through smart node 120. Operation of control module 113 may be based on trigger events identified by trigger module 111 and/or the factors that affect the trigger events. Additional factors that may be considered during the operation of the control module are safe operating limits and programmable delays for various trigger events. In some embodiments, a control signal may be based on commands received from the user via interface module 112 and/or other information.

Analysis module 114 may be configured to determine the basis for new triggers events and/or alter the basis for existing trigger events by analyzing multiple sensor output values, either simultaneously or across a period of time, optionally augmented by using external information including time, date, and/or other factors. Analysis module 114 may use trigger events as input from trigger module 111. Alternatively, and/or simultaneously, analysis module 114 may generate or adapt rules for use by trigger module 111, and/or directly affect operation of control module 113.

Analysis module 114 may use a prediction model. For example, power usage in an office building may be significantly reduced during the weekend, or during holidays, or shortly after extreme weather conditions. Should a user override a deactivation effectuated based on a trigger originating from the prediction model, this override information may be added—e.g. heuristically—to the prediction model used by analysis module 114. The prediction model may use different levels of aggressiveness in its attempts to reduce power wastage. Over time, analysis module 114 may become better tuned to the power usage patterns associated with a particular set of circuits within a power management system.

Information processing and/or manipulation may be performed at various or multiple levels in a local power network and/or power management system 100, with varying degrees of autonomy or user interaction. Fully automated control of power delivery is contemplated, to the extent possible after initial configuration, by the present technology.

Some constituent components of the power management system may be located remotely relative to the local power network, for example, within a computing device. Smart nodes may be assigned an identifier, such as a unique number, that may be used to facilitate communication within power management system 100, or externally with the user.

Figure 2:
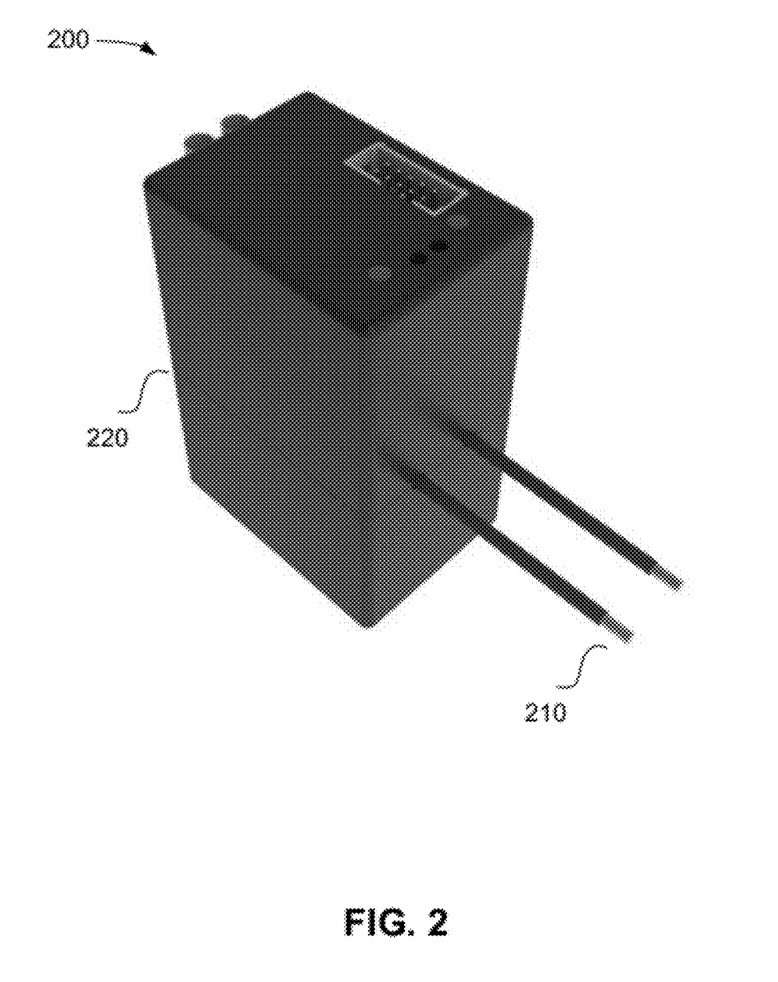
FIG. 2 illustrates an exemplary implementation of a smart node.
Figure 3:
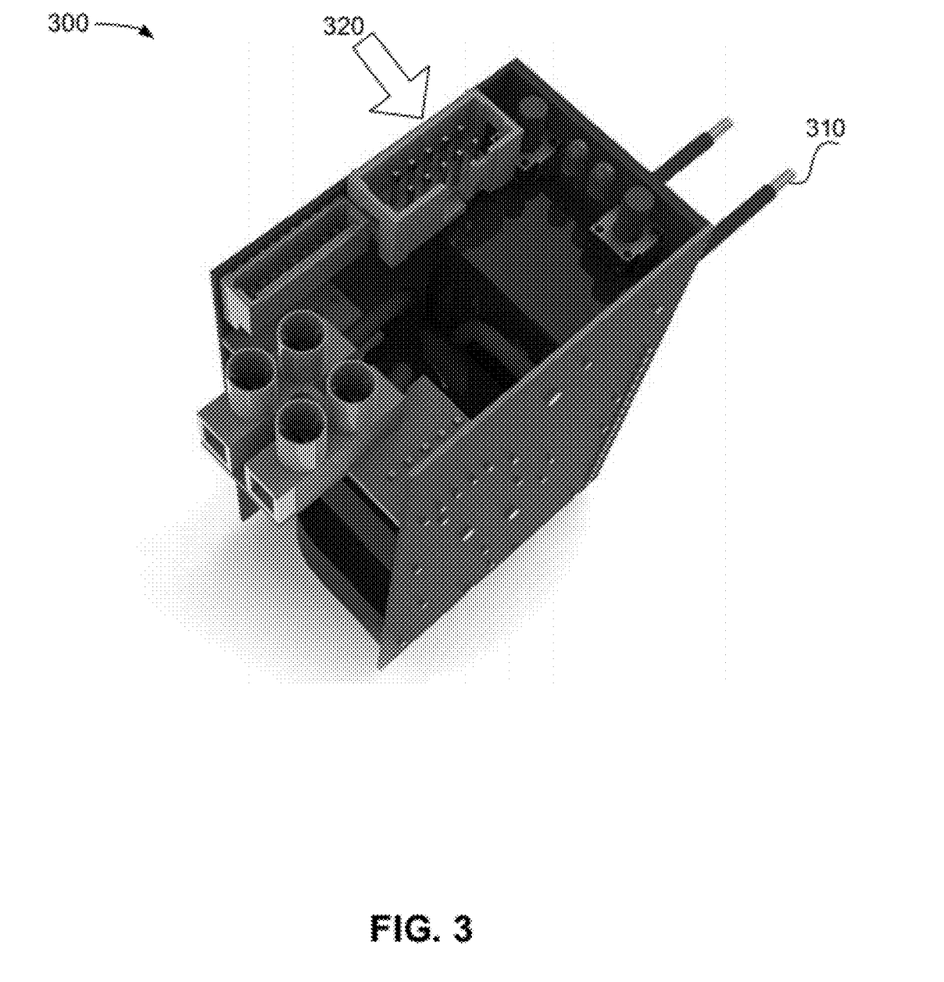
FIG. 3 illustrates an exemplary implementation of a smart node.

FIG. 2 illustrates an exemplary implementation 200 of a smart node. A smart node, such as smart node 120 in FIG. 1, may be installed in a standard circuit breaker panel, provided that at least part of the smart node is packaged in an enclosure configured to be mounted in a circuit breaker panel. Sample of such enclosures are shown in FIG. 2 and FIG. 3. The specification of the relevant characteristics of a standard circuit breaker panel may be obtained from organizations like the International Electrotechnical Commission (IEC). See e.g. IEC Standard 60755. Wires 210 may be designed to fit a standard residential circuit breaker panel. Housing 220 may be designed such that multiple smart nodes fit side-by-side in a standard residential circuit breaker panel, as further illustrated in FIG. 4.

FIG. 3 illustrates an exemplary implementation 300 of a smart node, such as smart node 120 in FIG. 1. Wires 310 may be designed to fit a standard (residential) circuit breaker panel. Additionally, FIG. 3 illustrates interface 320 that may communicatively couple a smart node to other components in power management system 100 of FIG. 1, as further illustrated in FIG. 4.

Figure 4:
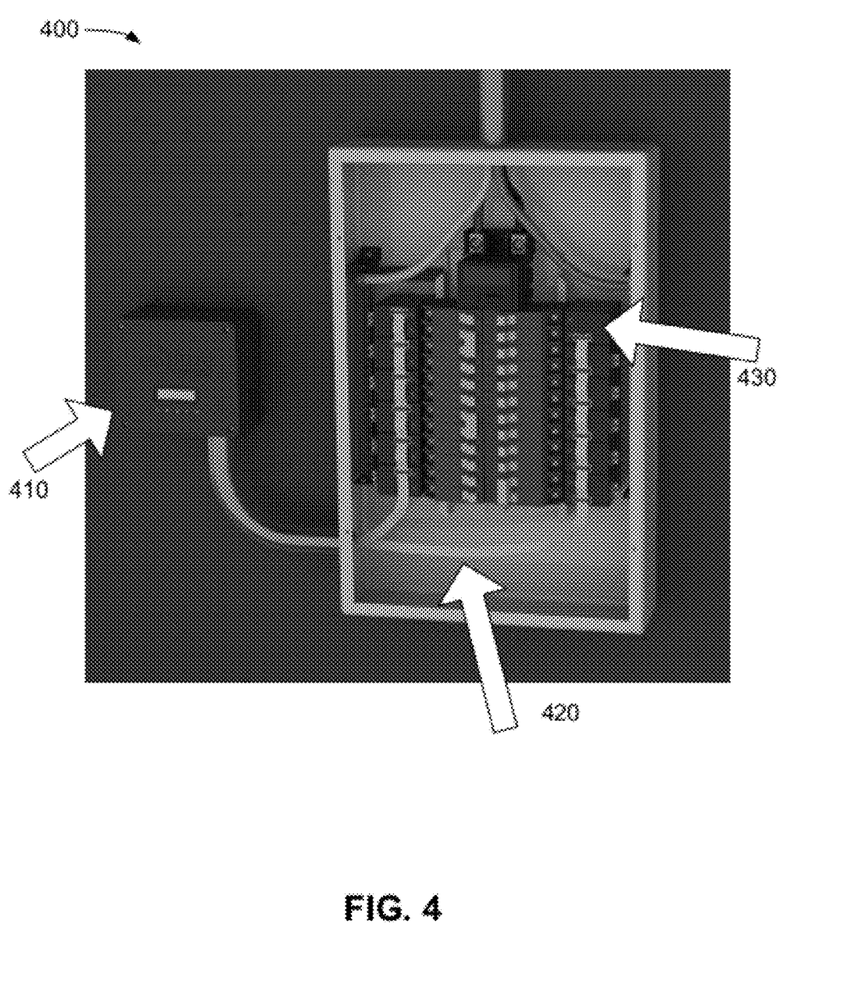
FIG. 4 illustrates an exemplary implementation of a power management system electrically coupled to a breaker panel.

FIG. 4 illustrates an exemplary implementation 400 of a power management system electrically coupled to a breaker panel. Smart node 430, which may be substantially similar to or the same as smart node 120 in FIG. 1, replaces a standard circuit breaker in one slot of a standard breaker panel. Multiple smart nodes may be coupled with information interface 420 to a breaker box 410, which may include a processor substantially similar to or the same as processor 110 from FIG. 1, electronic storage substantially similar to or the same as electronic storage 160 from FIG. 1, and optionally a bus substantially similar to or the same as bus 150 from FIG. 1. Breaker box 410, information interface 420, and the various smart nodes in FIG. 4 form a system substantially similar to power management system 100 as depicted schematically in FIG. 1.

Figure 5:
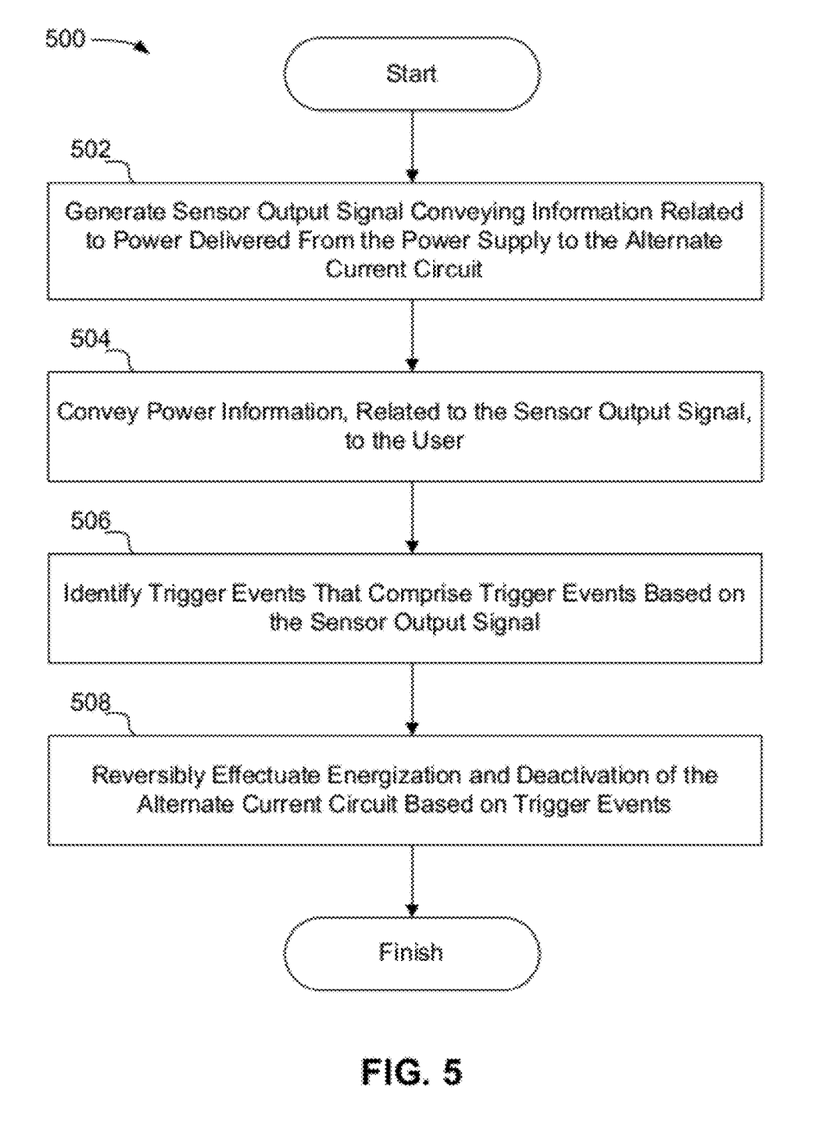
FIG. 5 illustrates an exemplary method for controlling power delivery to a circuit, in accordance with one or more embodiments of the present invention.

FIG. 5 illustrates an exemplary method 500 for monitoring and controlling power delivery to a circuit, in accordance with one or more embodiments of the present invention. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, a sensor output signal is generated conveying information related to power delivered from the power supply to an AC circuit. In one embodiment, operation 502 is performed by a sensor substantially similar to or the same as sensor 130 (shown in FIG. 1 and described above)

under the control of a control module substantially similar to or the same as control module 113 (shown in FIG. 1 and described above).

At an operation 504, power information—related to sensor output values—is conveyed to the user. In one embodiment, operation 504 is performed by a interface module substantially similar to or the same as interface module 112 (shown in FIG. 1 and described above) under the control of a control module substantially similar to or the same as control module 113 (shown in FIG. 1 and described above).

At an operation 506 a trigger event is identified comprising the sensor output signal. In one embodiment, operation 506 is performed by a trigger module substantially similar to or the same as trigger module 111 (shown in FIG. 1 and described above) under the control of a control module substantially similar to or the same as control module 113 (shown in FIG. 1 and described above).

At an operation 508 energization and deactivation of the circuit is reversibly effectuated based on the trigger signal. In one embodiment, operation 508 is performed by a control module substantially similar to or the same as control module 113 (shown in FIG. 1 and described above).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An electrical system configured to control power delivery from a power supply to one or more alternate current circuits, the electrical system being packaged in an enclosure configured to be mounted in a circuit breaker panel, the electrical system comprising:
    a sensor configured to generate a sensor output signal conveying information related to power delivered from the power supply to a first alternate current circuit;
    a processor configured to execute computer program modules, the computer program modules comprising:
        an interface module configured to convey power information to a user, wherein the power information is related to power delivered from the power supply to the first alternate current circuit,
        an analysis module configured to:
            analyze power usage of the first alternate current circuit to determine a power usage pattern of the first alternate current circuit, and
            create new rules and/or adapt existing rules based on the determined power usage pattern, the rules being configured for determining whether the first alternate current circuit should be energized or deactivated,
        a trigger module configured to identify trigger events, wherein the trigger events comprise trigger events identified based on application of the rules, and
        a control module configured to reversibly effectuate energization and deactivation of the first alternate current circuit based on trigger events identified by the trigger module.

2. The electrical system of claim 1, wherein the sensor comprises a voltage sensing circuit.

3. The electrical system of claim 1, wherein the sensor comprises a current sensing circuit.

4. The electrical system of claim 1, wherein the sensor comprises a power monitoring circuit.

5. The electrical system of claim 1, wherein the sensor comprises an energy usage monitoring circuit.

6. The electrical system of claim 1, wherein the sensor comprises a power quality monitoring circuit.

7. The electrical system of claim 1, wherein the electrical system is configured to be retrofitted in a pre-existing circuit breaker panel.

8. The electrical system of claim 1, wherein the trigger events further comprise trigger events identified based on one or more of a schedule-based event, a rule-based event, or a user command event.

9. The electrical system of claim 1, wherein the trigger events further comprise trigger events identified based on a power usage threshold for the power delivered from the power supply to the first alternate current circuit.

10. The electrical system of claim 1, wherein the trigger events comprise trigger events identified based on detection of an event external to the electrical system.

11. The electrical system of claim 1, wherein the interface module further receives commands from the user, and wherein the trigger events comprise trigger events identified based on commands received from the user via the interface module.

12. The electrical system of claim 1, wherein the electrical system is associated with an identifier.

13. The electrical system of claim 1, further comprising a second sensor configured to generate a sensor output signal conveying information related to power delivered from the power supply to a second alternate current circuit, and wherein
    the analysis module further configured to:
        analyze power usage of the second alternate current circuit to determine a power usage pattern of the second alternate current circuit,
        create new rules and/or adapt existing rules based on the determined power usage pattern of the first and second alternate current circuits, the rules being configured for determining whether the first and/or the second alternate current circuit should be energized or deactivated, and
    the control module is further configured to reversibly effectuate energization and deactivation of the first and/or the second alternate current circuit based on trigger events identified by the trigger module.

14. An electrical system configured to control power delivery from a power supply to one or more alternate current circuits, the electrical system being packaged in an enclosure configured to be mounted in a circuit breaker panel, the electrical system comprising:
    a sensor configured to generate a sensor output signal conveying information related to power delivered from the power supply to a first alternate current circuit;
    a first reversible node configured to effectuate energization and deactivation of the first alternate current circuit based on a control signal; and
    a processor configured to execute computer program modules, the computer program modules comprising:
        an interface module configured to convey information related to the sensor output signal to a user, wherein the interface module is further configured to receive a command from the user, the user command specifying criteria under which the first alternative circuit is to be energized or deactivated, an analysis module configured to:
  analyze power usage of the first alternate current circuit to determine a power usage pattern of the first alternate current circuit, and
  create new rules and/or adapt existing rules based on the determined power usage pattern, the rules being configured for determining whether the first alternate current circuit should be energized or deactivated;
a trigger module configured to identify trigger events, wherein the trigger events comprise trigger events identified based on the criteria specified by the received user command and further based on the application of the rules, and
a control module configured to generate the control signal based on the trigger events identified by the trigger module.

15. The electrical system of claim 14, wherein the sensor comprises a voltage sensing circuit.

16. The electrical system of claim 14, wherein the sensor comprises a current sensing circuit.

17. The electrical system of claim 14, wherein the sensor comprises a power monitoring circuit.

18. The electrical system of claim 14, wherein the sensor comprises an energy usage monitoring circuit.

19. The electrical system of claim 14, wherein the sensor comprises a power quality monitoring circuit.

20. The electrical system of claim 14, wherein the electrical system is configured to be retrofitted in a pre-existing circuit breaker panel.

21. The electrical system of claim 14, further comprising a circuit breaker.

22. The electrical system of claim 14, wherein the electrical system is associated with an identifier, and wherein the information that the interface module is configured to convey to the user comprises the identifier.

23. The electrical system of claim 14, further comprising
a second sensor configured to generate a sensor output signal conveying information related to power delivered from the power supply to a second alternate current circuit, and
a second a reversible node configured to effectuate energization and deactivation of the second alternate current circuit based on a second control signal; and wherein
the interface module is further configured to receive a second command from the user, the second user command specifying criteria under which the second alternative circuit is to be energized or deactivated,
the analysis module is further configured to:
  analyze power usage of the second alternate current circuit to determine a power usage pattern of the second alternate current circuit, and
  create new rules and/or adapt existing rules based on the determined power usage pattern of the first and second alternate current circuits, the rules being configured for determining whether the first and/or the second alternate current circuit should be energized or deactivated, and
the control module is further configured to generate control signal for the first reversible node and/or the second reversible node to effectuate energization and deactivation of respective alternate current circuit based on the trigger events identified by the trigger module.

24. An electrical system configured to control power delivery from a power supply to one or more alternate current circuits, the electrical system being packaged in an enclosure configured to be mounted in a circuit breaker panel, the electrical system comprising:
a processor configured to execute computer program modules, the computer program modules comprising:
  an interface module configured to convey power information to a user and to receive commands from the user, wherein the power information is related to power delivered from the power supply to a first alternate current circuit, and wherein the interface module is further configured to transmit control commands to a first reversible node configured to effectuate energization and deactivation of the first alternate current circuit in response to the commands received from the user, and
  an analysis module configured to:
    analyze power usage of the first alternate current circuit to determine a power usage pattern of the first alternate current circuit, and
    create new rules and/or adapt existing rules based on the determined power usage pattern, the rules being configured for determining whether the first alternate current circuit should be energized or deactivated; and
  wherein the interface module is further configured such that the control commands comprise control commands transmitted further based on application of the rules.

25. The electrical system of claim 24, wherein the control commands comprise control commands transmitted based on the power information.

26. The electrical system of claim 24, wherein the control commands comprise control commands transmitted based on one or more of a schedule-based event, a rule-based event, or a user-command event.

27. The electrical system of claim 24, wherein the control commands comprise control commands transmitted based on a power threshold for the power delivered from the power supply to the first alternate current circuit.

28. The electrical system of claim 24, wherein
the interface module is further configured to transmit control commands to a second reversible node configured to effectuate energization and deactivation of a second alternate current circuit in response to the commands received from the user, and
the analysis module is further configured to
  analyze power usage of the second alternate current circuit to determine a power usage pattern of the second alternate current circuit, and
  create new rules and/or adapt existing rules based on the determined power usage pattern of the first and second alternate current circuits, the rules being configured for determining whether the first and/or the second alternate current circuit should be energized or deactivated.

* * * * *